United States Patent [19]
Hatch et al.

[11] Patent Number: 4,487,473
[45] Date of Patent: Dec. 11, 1984

[54] ONE DIMENSIONAL SCANNING SYSTEM

[75] Inventors: Marcus R. Hatch, Waltham; William J. Lepsevich, Dedham, both of Mass.

[73] Assignee: Honeywell Inc., Minneapolis, Minn.

[21] Appl. No.: 336,238

[22] Filed: Dec. 31, 1981

[51] Int. Cl.³ .............................................. G02B 27/17
[52] U.S. Cl. ..................................... 350/6.8; 350/1.3; 350/6.4
[58] Field of Search ................. 350/6.8, 449, 1.2, 1.3, 350/6.4

[56] References Cited
U.S. PATENT DOCUMENTS
3,885,857  5/1975  Flogaus et al. ...................... 350/6.8

Primary Examiner—John K. Corbin
Assistant Examiner—Rebecca D. Gass
Attorney, Agent, or Firm—John S. Solakian; Laurence J. Marhoefer

[57] ABSTRACT

A scanning system comprising input optics including an afocal telescope, output optics including an imaging lens and a linear spaced array of detectors, a scanner including a hollow inwardly reflecting polygonal prism rotated about its longitudinal axis, which is subtantially parallel to the axis of the input optics, and two folding mirrors which are contained within the outline of the prism, and with respect to which the prism rotates.

9 Claims, 1 Drawing Figure

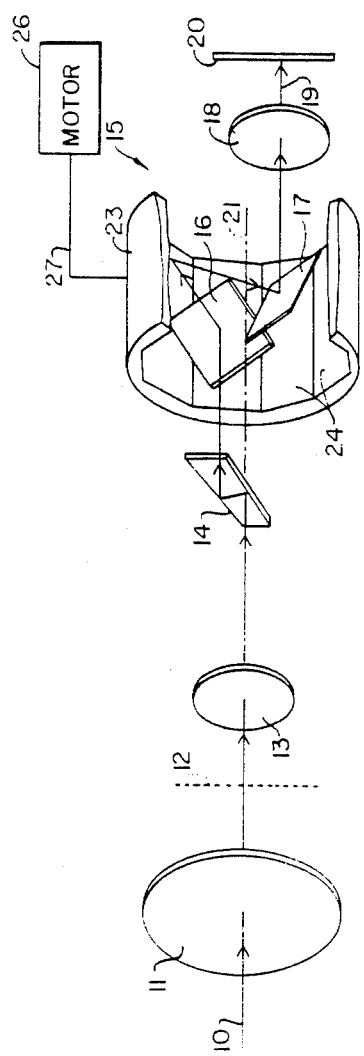

ONE DIMENSIONAL SCANNING SYSTEM

BACKGROUND OF THE INVENTION

The present invention generally relates to the field of optical instruments, and more particulaly to infrared sensitive imaging apparatus for performing continuous repeated or stepped transverse scans of a scene.

The use of infrared wavelengths is of known advantage when temperature information is required from a scene. Detectors that are sensitive to infrared wavelengths are necessary to convert the infrared energy to a form that is perceptible to an observer. If the radiation from a scene were projected on a mosiac of such detectors at a focal plane within the optical system and electrically sampled and formatted into a television (TV) type presentation a continuous picture of the scenes thermal image would result. In practice, mosiacs of detectors of the complexity necessary to yield high resolution imagery are not practical due to relatively low yields.

The alternatives to a complex detector mosaic based system are systems in which the field of view timeshares a single detector, a simple linear array of detectors, or a sparse mosiac, by the use of an opto-mechanical scanning arrangement. Masaics and linear (i.e., a row of detectors) arrays are of significant advantage in the application of TDI (time delay and integration) which utilizes the linear scan of the polygon scanner and electrical time delays within the signal processing to improve signal-to-noise ratios in the system to which it is applied. Time-sharing of a single detector by use of some form of area scanner is most efficient as far as detector utilization is concerned, but does not provide the sensitivity and resolution of a multiple detector system with a simple transverse scan. The latter system thus appears to offer the optimum compromise between complexity and sensitivity.

One past solution to the problem is described in The Infrared Handbook prepared by The Infrared Information and Analysis Center, Environmental Research Institute of Michigan and prepared for the Office of Naval Research, Department of the Navy, 1978, p.p. 10-17. This solution uses an internal polygon scanner. However, the optical path is folded in such a manner so as to produce a nonlinear "windshield wiper" scan pattern.

Another solution is described in U.S. Pat. No. 3,728,545, by Irving Abel. In this solution, the scanner is used in converging light, which makes the image appear to be on a curved surface. This field curvature can only be removed by the input optics for a narrow line of detectors. It is sometimes desirable to add detectors in the scan direction in order to increase sensitivity. This is known as time delay and integration (TDI). To do this with the aforementioned scanning system would require a focal plane matched to the field curvature caused by scanning in noncollimated light.

It is therefore the object of this invention to provide an improved infrared imaging system which incorporates a linear scan, whose compactness lies in its ability to include all optical elements in an in-line or coaxial configuration.

SUMMARY OF THE INVENTION

The application of this invention is aimed at overcoming the limitations of past scanning methods. The approach replaces the classic external polygon scanner with an in-line or coaxial scanner without incurring "windshield wiper" scan distortion. This compact configuration offers major packaging advantages to systems aiming at a cylindrical or "pipe" configuration. Since scanning occurs in collimated light, the input optics are easier to design and allow for easy compatibility with interchangeable telescope optics to different fields of view. The system may utilize a linear spaced array of detectors across the field of view of the instrument, whose field of view is cyclically swept to provide a linear scan. More particularly, the scanning system comprises input optics including an afocal telescope, output optics including an imaging lens, and, for example, a linear array of detectors, a scanner including a hollow inwardly reflecting polygon scanner rotating about its longitudinal axis, which is parallel to the axis of the input optics, and two folding mirrors which are contained within the outline of the polygon scanner, and with respect to which the drum rotates.

BRIEF DESCRIPTION OF THE DRAWINGS

The above and other objects of the present invention are achieved in the illustrative embodiment as described with respect to the sole FIGURE which illustrates the scanning system of the present invention.

DETAILED DESCRIPTION OF THE PREFERRED EMBODIMENT(S)

The sole FIGURE is an illustration of one embodiment of the scanning system of the present invention. Essentially collimated infrared energy (i.e., radiation) from the scene is received along the input optical axis 10 by an objective lens 11, which produces a real image at the plane of a field stop 12. The radiation is recollimated by collimating lens 13. A prism 14 may be used if it is desired that the input optical axis 10 lie on the axis of rotation of the polygon. The polygon scanner 15 is shown to have a single moving part in the form of hollow inwardly reflecting facets 24. The number of facets is a matter of selection by the designer and may be even or odd. Facets of the rotating polygon may or may not include an angular cant varying in a repeating or nonrepeating pattern to incorporate interlace in the corresponding system and may also include slight variations in the polygon angular facet subdivision to allow dither in the direction of scan.

The moving element of the polygon scanner 15 is defined as the drum 23. The drum 23 is mounted in any suitable fashion for rotation about an axis 21 approximating the normal to the polygon surfaces at their centers. In the embodiment shown in the sole FIGURE, the faces of the polygon scanner 24 each comprise planes parallel to axis 21. A slight departure from this parallel relationship may be used to produce interlaced scan lines if this is desired. A secondary means of providing interlace may be accomplished mechanically by the introduction of a programmed wobble at one of the points of suspension of the drum 23. Any constant speed motor 26 of suitable power rating may be used for driving the drum 23, and may be mechanically coupled or part of the motor rotor itself as indicated schematically by line 27.

Contained as part of scanner 15 and within the outline of the drum 23 are folding mirrors 16 and 17 which are fixed by any suitable means so that the drum 23 rotates around them. The radiation is brought to final focus by detector lens 18 onto the detector 20, which may be one or more detectors in a linear or mosaic array. All of the lenses utilized in the scanning system of the present invention may comprise more than one optical element, and must be made of a suitable transmitting material.

In operation, the scanning system sweeps the image of the scene across the detector(s) as many times per revolution of the drum 23 as the latter has internally reflecting faces 24. During each sweep or scan, in response to the image received, each detector provides an output which continuously varies with the irradiation presented to it. These outputs are suitably processed by amplification and filtering, if necessary, and are supplied to a means of display, which can be an electrical readout device such as a cathode ray tube (CRT).

Numerous objects and advantages of the present invention have been set forth in the foregoing description, together with details of the structure and the functions of the invention, and the novel features thereof are pointed out in the appended claims. The disclosure, however, is illustrative only, and changes may be made in detail, especially in matters of shape, size, and arrangement of parts, within the principles of the invention, to the full extent indicated by the broad general meaning of the terms in which the appended claims are expressed.

Having described the invention, what is claimed as new and novel and for which it is desired to secure Letters Patent is:

1. Apparatus for scanning a field of view along a line of sight, said apparatus comprising:
   A. means for receiving infrared energy from said field of view, said means for receiving including means for substantially collimating said infrared energy;
   B. a hollow scanning drum rotatable about a first axis, including a plurality of inwardly reflecting surfaces substantially parallel to said first axis;
   C. means for causing rotation of said drum;
   D. first optical means, including a first stationary folding mirror, fixed with respect to said drum and positioned to direct said energy collimated by said means for collimating to impinge in a substantially collimated manner on said reflecting surfaces successively as said drum rotates;
   E. at least one radiation sensitive detector fixed with respect to said drum; and
   F. second optical means, including a second stationary folding mirror, fixed with respect to said drum and arranged to receive substantially collimated energy reflected from said reflecting surface and arranged to direct such collimated energy toward said at least one radiation sensitive detector so that the plane of incidence of the optical axis at said reflecting surfaces is substantially perpendicular to said first axis.

2. Apparatus according to claim 1 in which said surfaces are plane.

3. Apparatus according to claim 1 in which said surfaces jointly define a substantially regular polyhedral prism.

4. Apparatus according to claim 1 in which said first and second optical means are contained within the outline of said drum.

5. Apparatus according to claim 1 in which said surfaces slightly depart from a parallel relation to said first axis.

6. Apparatus according to claim 1 in which said surfaces slightly depart from a perfect equal angular subtense about the circumference of the drum.

7. Apparatus as in claim 1 wherein said at least one radiation sensitive detector is an array of said detectors.

8. Apparatus according to claim 7 wherein said array is mosaic in configuration.

9. Apparatus according to claim 7 wherein said array is linear in configuration.

* * * * *